United States Patent
Ji et al.

(10) Patent No.: US 11,928,009 B2
(45) Date of Patent: Mar. 12, 2024

(54) PREDICTING A ROOT CAUSE OF AN ALERT USING A RECURRENT NEURAL NETWORK

(71) Applicant: International Business Machines Corporation, Armonk, NY (US)

(72) Inventors: Chun Qi Ji, Beijing (CN); Qiang Li, Beijing (CN); Jing Sun, Beijing (CN); Zong Nan Jin, Beijing (CN); He Jun, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 70 days.

(21) Appl. No.: 17/395,730

(22) Filed: Aug. 6, 2021

(65) Prior Publication Data
US 2023/0045303 A1     Feb. 9, 2023

(51) Int. Cl.
*G06F 11/00*       (2006.01)
*G06F 11/07*       (2006.01)
*G06F 18/231*      (2023.01)
*G06N 3/08*        (2023.01)

(52) U.S. Cl.
CPC .......... *G06F 11/079* (2013.01); *G06F 18/231* (2023.01); *G06N 3/08* (2013.01)

(58) Field of Classification Search
CPC ....... G06F 11/079; G06K 9/6219; G06N 3/08
See application file for complete search history.

(56) References Cited

U.S. PATENT DOCUMENTS

| | | | | |
|---|---|---|---|---|
| 6,795,935 | B1 * | 9/2004 | Unkle ............... | G05B 23/0275 701/19 |
| 8,032,621 | B1 | 10/2011 | Upalekar et al. | |
| 9,679,243 | B2 | 6/2017 | Zou et al. | |
| 10,078,571 | B2 * | 9/2018 | Altman ............... | G06F 11/3072 |
| 2007/0100487 | A1 * | 5/2007 | Cheng ............. | G05B 19/41875 700/51 |
| 2009/0024356 | A1 * | 1/2009 | Platt .................. | G05B 23/0281 702/181 |
| 2009/0282297 | A1 * | 11/2009 | Anna .................. | G06F 11/0781 714/48 |
| 2012/0096316 | A1 | 4/2012 | Suit | |

(Continued)

FOREIGN PATENT DOCUMENTS

| | | |
|---|---|---|
| CN | 110413703 A | 11/2019 |
| CN | 111526070 A | 8/2020 |

(Continued)

OTHER PUBLICATIONS

International Search Report; International Application No. PCT/CN2022110465; International Filing Date: May 8, 2022; dated Apr. 11, 2022; 10 pages.

*Primary Examiner* — Loan L. T. Truong
(74) *Attorney, Agent, or Firm* — CANTOR COLBURN LLP; Teddi Maranzano

(57) ABSTRACT

Aspects of the invention include detecting an error alert from a target computer system. In response to detecting the error alert, performance data is then retrieved from the target computer system. A gated recurrent unit (GRU) neural network is used to generate a prediction of a root cause of the error alert based on the performance data. The weights of a reset gate of the GRU neural network are adjusted based on received feedback of the prediction.

17 Claims, 9 Drawing Sheets

(56) References Cited

U.S. PATENT DOCUMENTS

| | | | |
|---|---|---|---|
| 2012/0123739 A1* | 5/2012 | Sethumadhavan | G06F 11/3024 702/186 |
| 2015/0248453 A1* | 9/2015 | Martick | G06F 16/24 702/187 |
| 2018/0268291 A1* | 9/2018 | Turner | G06N 3/088 |
| 2018/0307551 A1 | 10/2018 | Bacha | |
| 2019/0004884 A1* | 1/2019 | Kirshenbaum | G06F 11/3006 |
| 2019/0228296 A1 | 7/2019 | Gefen et al. | |
| 2019/0354836 A1* | 11/2019 | Shah | G06N 3/0445 |
| 2020/0309911 A1* | 10/2020 | Meissner | G01S 17/42 |
| 2020/0349495 A1* | 11/2020 | Chougule | G06Q 50/01 |
| 2021/0056430 A1 | 2/2021 | Wu et al. | |
| 2021/0142259 A1* | 5/2021 | Kalia | G06Q 10/063112 |
| 2021/0232376 A1* | 7/2021 | Wang | G06N 20/00 |
| 2021/0311817 A1* | 10/2021 | Badiger | G06F 11/0715 |
| 2021/0383206 A1* | 12/2021 | Teppoeva | G06N 3/08 |
| 2022/0030087 A1* | 1/2022 | Chatterjee | H04L 41/147 |
| 2022/0067626 A1* | 3/2022 | Unnikrishnan | G06F 3/14 |
| 2022/0094452 A1* | 3/2022 | Maier | H04B 17/30 |
| 2022/0107852 A1* | 4/2022 | Kulkarni | G06F 40/284 |
| 2022/0173889 A1* | 6/2022 | Wilson | H04L 63/1408 |
| 2022/0317677 A1* | 10/2022 | Shah | G05B 23/0283 |
| 2022/0374700 A1* | 11/2022 | Zhang | G06N 3/08 |
| 2023/0136374 A1* | 5/2023 | Zeiynali Farid | G08G 1/065 701/119 |

FOREIGN PATENT DOCUMENTS

| | | |
|---|---|---|
| CN | 111552609 A | 8/2020 |
| CN | 112052151 A | 12/2020 |
| CN | 112152830 A | 12/2020 |
| CN | 112395170 A | 2/2021 |
| CN | 113010389 A | 6/2021 |
| KR | 102107689 B1 | 5/2020 |
| WO | 2021084286 A1 | 5/2021 |

* cited by examiner

400

PREDICTING A ROOT CAUSE OF AN ALERT USING A RECURRENT NEURAL NETWORK

BACKGROUND

The present invention generally relates to programmable computing systems, and more specifically, to programmable computing systems configured for predicting a root cause of an alert using a recurrent neural network.

Monitoring software enables a system administrator to track a computer system's performance and resources. The administrator can track the system's hardware and the software to detect events indicative of an error. As computer systems grow more complex, an error can be the result of multiple causes which become difficult to ascertain. For example, if the swap space in an operating system is below an acceptable level, the potential cause is any one of memory, a process, and hardware. In this instance, a system administrator is unable to determine which one cause or combination of potential causes is the root cause of the law swap space. Furthermore, as computer systems evolve, administrators are unable to adapt from their static rules-based analysis. This inability increases the probability that the root cause will be misidentified or not identified at all.

SUMMARY

Embodiments of the present invention are directed to a computer-implemented method for predicting a root cause of alert using a recurrent neural network. A non-limiting example of the computer-implemented method includes detecting an error alert from a target computer system. In response to detecting the error alert, performance data is then retrieved from the target computer system. A gated recurrent unit (GRU) neural network is used to generate a prediction of a root cause of the error alert based on the performance data. The weights of a reset gate of the GRU neural network are adjusted based on received feedback of the prediction.

The herein described method provides a more accurate way of monitoring and alerting systems. The use of the GRU neural network enables feedback from users to improve the accuracy of the predicted root causes of an error. The GRU neural network uses the feedback to remember the features that are more valuable for accurately predicting a root cause. The GRU neural network further uses the feedback to forget the features that are less valuable for accurately predicting a root cause. In this sense, the predictions improve with each use, as feedback from users is continuously used to adjust the weights of the GRU neural network to provide more accurate predictions.

Embodiments of the present invention are further directed a system for predicting a root cause of alert using a recurrent neural network. A non-limiting example of the system includes detecting an error alert from a target computer system. In response to detecting the error alert, performance data is then retrieved from the target computer system. A GRU neural network is used to generate a prediction of a root cause of the error alert based on the performance data. The weights of a reset gate of the GRU neural network are adjusted based on received feedback of the prediction.

Embodiments of the present invention are further directed a computer program product for predicting a root cause of alert using a recurrent neural network. A non-limiting example of the computer program product includes detecting an error alert from a target computer system. In response to detecting the error alert, performance data is then retrieved from the target computer system. A GRU neural network is used to generate a prediction of a root cause of the error alert based on the performance data. The weights of a reset gate of the GRU neural network are adjusted based on received feedback of the prediction.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention provide computer-implemented methods, computing systems, and computer program products for predicting a root cause of an alert using a recurrent neural network (RNN). The RNN is in the form of a gated recurrent unit (GRU) neural network, which is operable to retain important information and forget unnecessary information based on user feedback from previous predictions of the GRU neural network.

Root cause analysis is a computer-enabled process used by software engineers to determine a cause of an error in a computing system. As a computer system becomes more complex, the software engineers are tasked with isolating increasingly complex interactions between the system's components to determine a cause of an error. Software tools are increasingly unable to manage and process the data received from these complex computer systems. Yet, the software engineers use these software tools to determine a root cause of a computer issue in spite of incomplete information.

One or more embodiments of the present invention address one or more of the shortcomings of root cause analysis by providing computer-implemented methods, computing systems, and computer program products that determine a root cause of an error in a computer system. A gated recurrent unit (GRU) neural network is trained using performance data collected from a computer system in an abnormal state. The trained GRU neural network is operable to receive parameter variables from a target computer system in an error state and predict a root cause of the error. The GRU neural network receives feedback for its prediction and adjusts its weights based on the feedback to generate more accurate predictions.

Figure 1:
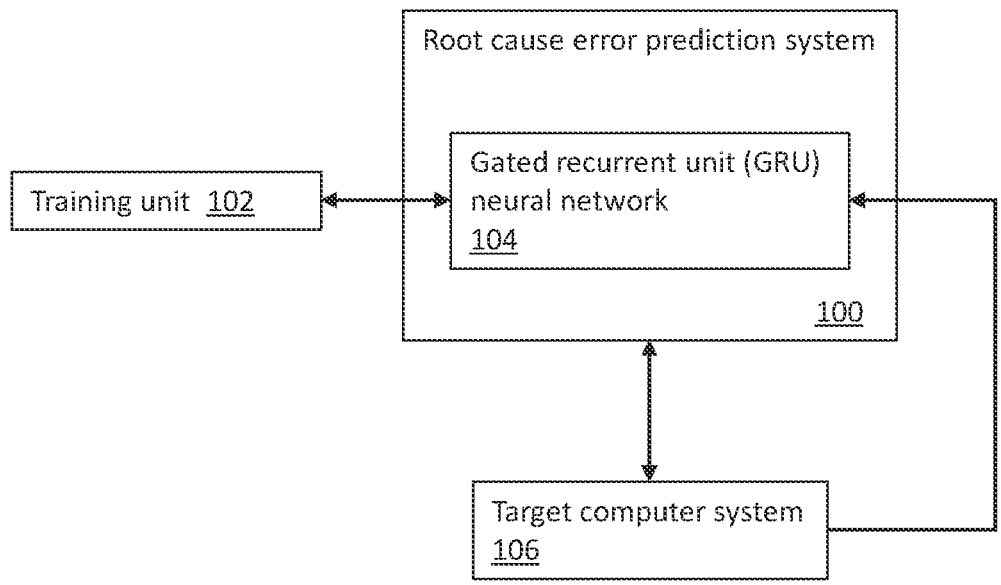
FIG. 1 illustrates a system for predicting a root cause of an error alert according to one or more embodiments of the present invention.

Referring to FIG. 1, a system 100 for predicting a root cause of an error alert in accordance with one or more embodiments of the present invention is shown. The system 100 includes a gated recurrent unit (GRU) neural network 104, which includes an array of GRUS. An individual GRU is described in more detail with relation to FIG. 2. A training unit 102 is implemented to train the GRU neural network 104 to predict the root cause of an error alert. The training unit 102 uses a combination of unsupervised learning and semi-supervised learning to train the GRU neural network 104 to predict a root cause of an error alert and provide a suggestion for addressing the root cause. The training process for the GRU neural network 104 is described in more detail with reference to FIGS. 3 and 4. The trained GRU neural network 104 is operable to receive an error alert from a target computer system, extract data from the target computer system 106, predict a root cause of an error alert, and provide a recommendation to address the error. The functionality of the GRU neural network is described in greater detail with regard to FIGS. 5 and 6. It should be appreciated that the system 100 can be implemented by the computer system 900 as described by FIG. 9 and/or a cloud computing node 50 as described by FIG. 7.

Figure 2:
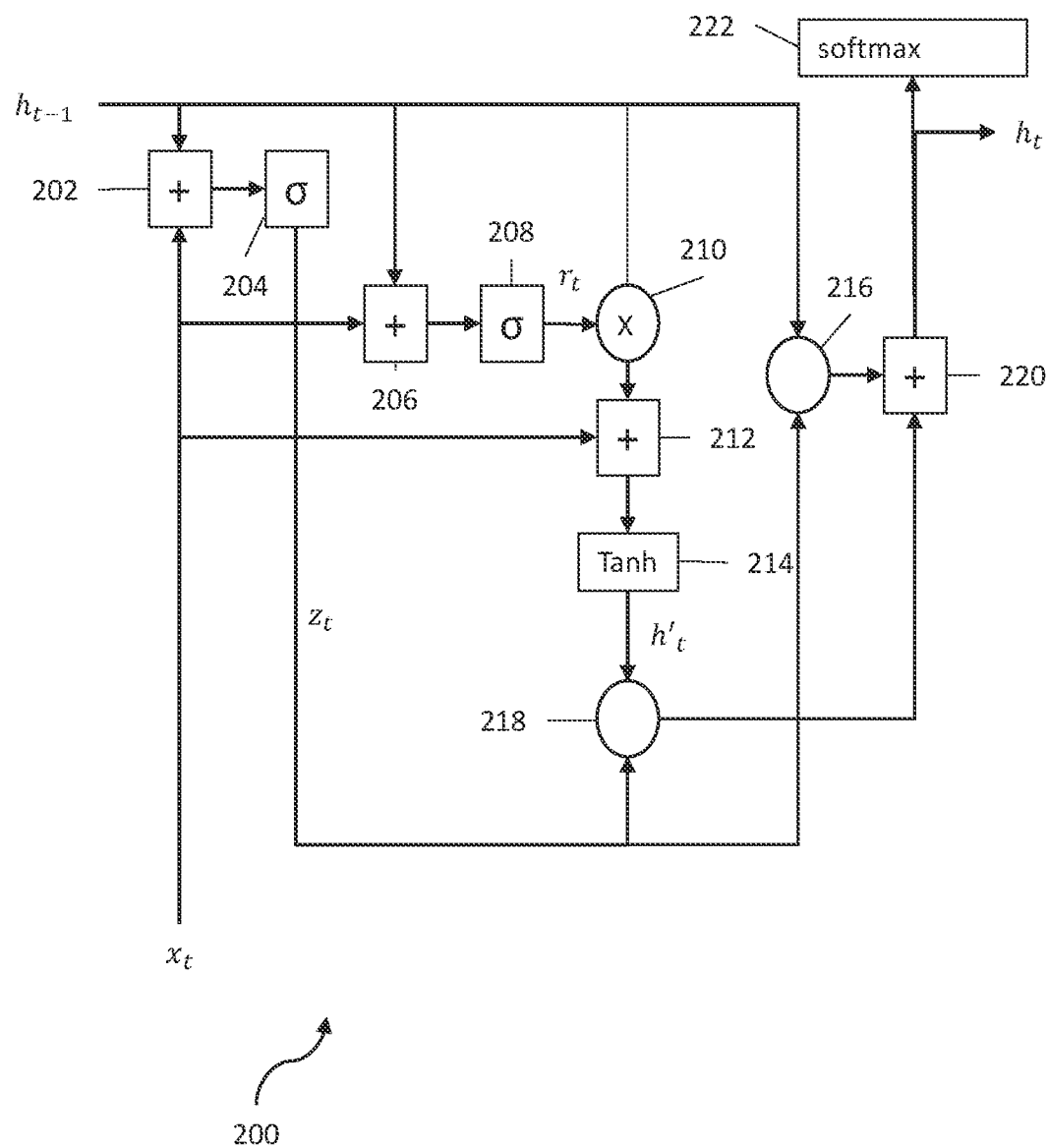
FIG. 2 illustrates a gated recurrent unit (GRU) according to one or more embodiments of the present invention.

Referring to FIG. 2, a gated recurrent unit (GRU) 200 of the GRU neural network 104 is illustrated according to one or more embodiments of the present invention. The GRU 200 is connected to other GRUs (not shown) of an array of connected GRUs, forming a GRU neural network 104. The GRU neural network 104 is an artificial neural network designed for sequential data or time-series data. The GRU neural network 104 is distinguishable from other forms of neural networks as information retrieved from prior inputs is used to influence current inputs and current outputs. Other forms of neural networks treat inputs as independent from outputs. As described herein, the GRU neural network 104 uses information from a prior state of a target computer system 106 to predict a root cause of an error at a current state of the target computer system 106.

The GRU 200 employs a reset gate, $z_t$, and an update gate, $r_t$, to determine how much information the GRU neural network 104 retains and how much information is forgotten. The reset gate's function is to determine how much of the past information needs to retained and passed to along to influence future information. To calculate the reset gate, $z_t$, the GRU 200 receives a first input $x_t$ from an input layer of the GRU neural network 104. Input $x_t$ provides information of a current state of a target computer system 106. For example, $x_t$ can include a real-time operating system index parameter. The GRU 200 multiplies the first input $x_t$ with a first weight to produce a first weighted input $x'_t$ (not shown). The GRU 200 also receives a second input, $h_{t-1}$, which is an output or hidden state from another GRU of the GRU neural network 104. The GRU 200 multiplies the second input $h_{t-1}$ with a second weight to produce a second weighted input $h'_{t-1}$ (not shown). The first weighted input $x'_t$ and the second weighted input $h'_t$ are summed together by a first adder 202. The resulting sum is processed through a first sigmoid function 204 to product a first update gate $z_t$. The first sigmoid function 204 is a mathematical function, executed via a combination of logic gates, that produces an output within the range of 0 to 1.

The reset gate's function is to determine how much information can be forgotten by the GRU neural network 104. To calculate the reset gate, $r_t$, the GRU 200 also receives the first input $x_t$ from the input layer, and multiplies it with a third weight to produce a third weighted input $x''_t$ (not shown). The GRU 200 also receives the second input $h_{t-1}$, and multiplies the second input by a fourth weight to produce a fourth weighted input $h''_{t-1}$ (not shown). The third weighted input $x''_t$ and the fourth weighted input $h''_{t-1}'$ are added together by a second adder 206 and the sum is processed through a second sigmoid function 208 to produce a first reset gate $r_t$.

The reset gate, $z_t$, and the update gate, $r_t$ are used to influence the output $h_t$. The GRU 200 multiples the first input $x_t$ with a fifth weight to generate a fifth weighted input $x'''_t$, and multiplies the second input $h_{t-1}$ with a sixth weight to generate a sixth weighted input $h'''_{t-1}$. The GRU 200 then calculates a first Hadamard product between the first reset gate $r_t$ and the first weighted $h_{t-1}'$ at a Hadamard unit 210. This determines which information to remove from previous time steps. The GRU then sums the fifth weighted input $x'''_t$ and the first Hadamard product at a third adder 212. The GRU 200 then applies a hyperbolic tangent function 214. The hyperbolic tangent function 214 is a mathematical function, executed via a combination of logic gates, that produces an output within the range of 0 to 1.

The GRU 200 then calculates the output $h_t$. The GRU 200 applies an element-wise multiplication to the update gate $r_t$ at a first multiplier 216. The GRU 200 then applies an element-wise multiplication to 1-$z_t$ and $h'_t$. at a second multiplier 218. The GRU 200 then sums the result from the first multiplier 216 and the second multiplier 218 at a fourth adder 220. The output $h_t$ can then be sent to a next GRU unit (e.g., next time step) of the GRU neural network 104 or to be processed by a SoftMax function 222 of a classifier of the GRU neural network 104. The GRU neural network 104 can include a classifier for generating a prediction of a root cause of an error alert. The GRU neural network 104 can also include a classifier for generating a prediction of a suggestion for addressing the root cause of the error alert.

The weights of the update gate and the reset can be adjusted based on feedback regarding the predicted root cause of an error and predicted suggestion to address the root cause of an error. For example, the system 100 can predict that the root cause of an error is occurring at a cache of a target computer system 106. The system 100 can further suggest clearing the cache to address the error. The system 100 can monitor the target system 106 in real-time and determine whether the cache is cleared within a predetermined time interval of providing the recommendation. If the cache was cleared, the system 100 further monitors real-time performance data to determine whether the error has been addressed. The system 100 can then perform back-propagation to adjust the weights of the update gate and the reset gate to reflect whether (1) the suggestion of clearing the cache is accepted or not, and (2) clearing the cache resolved the error alert. For example, if the cache was cleared and this resolved the error alert, the update and reset gate weights can be adjusted to remember the performance data features that led to the determination that the error was at the cache. If, however, the cache was cleared and this did not resolve the error alert, the update and reset gate weights can be adjusted to forget the performance data features that led to the determination that the error was at the cache.

The phrases "neural network" and "machine learning" broadly describes a function of electronic systems that learn from data. A machine learning system, engine, or module can include a machine learning algorithm that can be trained, such as in an external cloud environment (e.g., the cloud computing environment 50), to learn functional relations between inputs and outputs that are currently unknown. In one or more embodiments, machine learning functionality can be implemented using a GRU neural network 104, having the capability to be trained to perform a currently unknown function. In machine learning and cognitive science, neural networks are a family of statistical learning models inspired by the biological neural networks of animals, and in particular, the brain. Neural networks can be used to estimate or approximate systems and functions that depend on a large number of inputs.

The GRU neural network 104, can be embodied as so-called "neuromorphic" systems of interconnected processor elements that act as simulated "neurons" and exchange "messages" between each other in the form of electronic signals. Similar to the so-called "plasticity" of synaptic neurotransmitter connections that carry messages between biological neurons, the connections in the a GRU neural network 104, that carry electronic messages between simulated neurons are provided with numeric weights that correspond to the strength or weakness of a given connection. During training, The weights can be adjusted and tuned based on experience, making the a GRU neural network 104, adaptive to inputs and capable of learning. After being weighted and transformed by a function determined by the network's designer, the activation of these input neurons are then passed to other downstream neurons, which are often referred to as "hidden" neurons. This process is repeated until an output neuron is activated. The activated output neuron determines which character was read.

Figure 3:
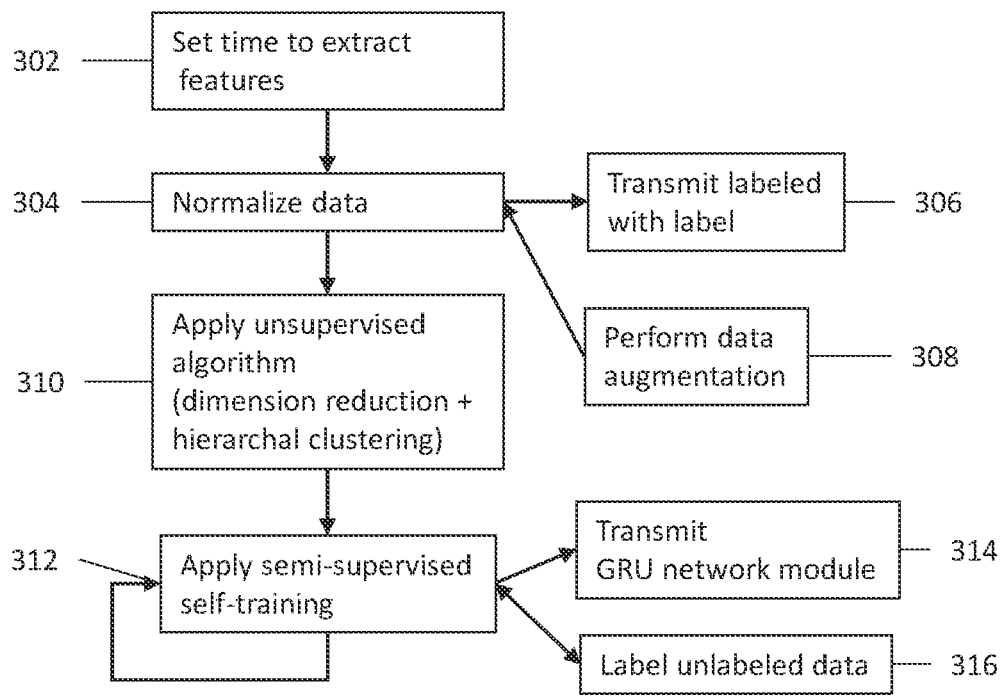
FIG. 3 illustrates a process flow for training a GRU neural network according to one or more embodiments of the present invention.
Figure 9:
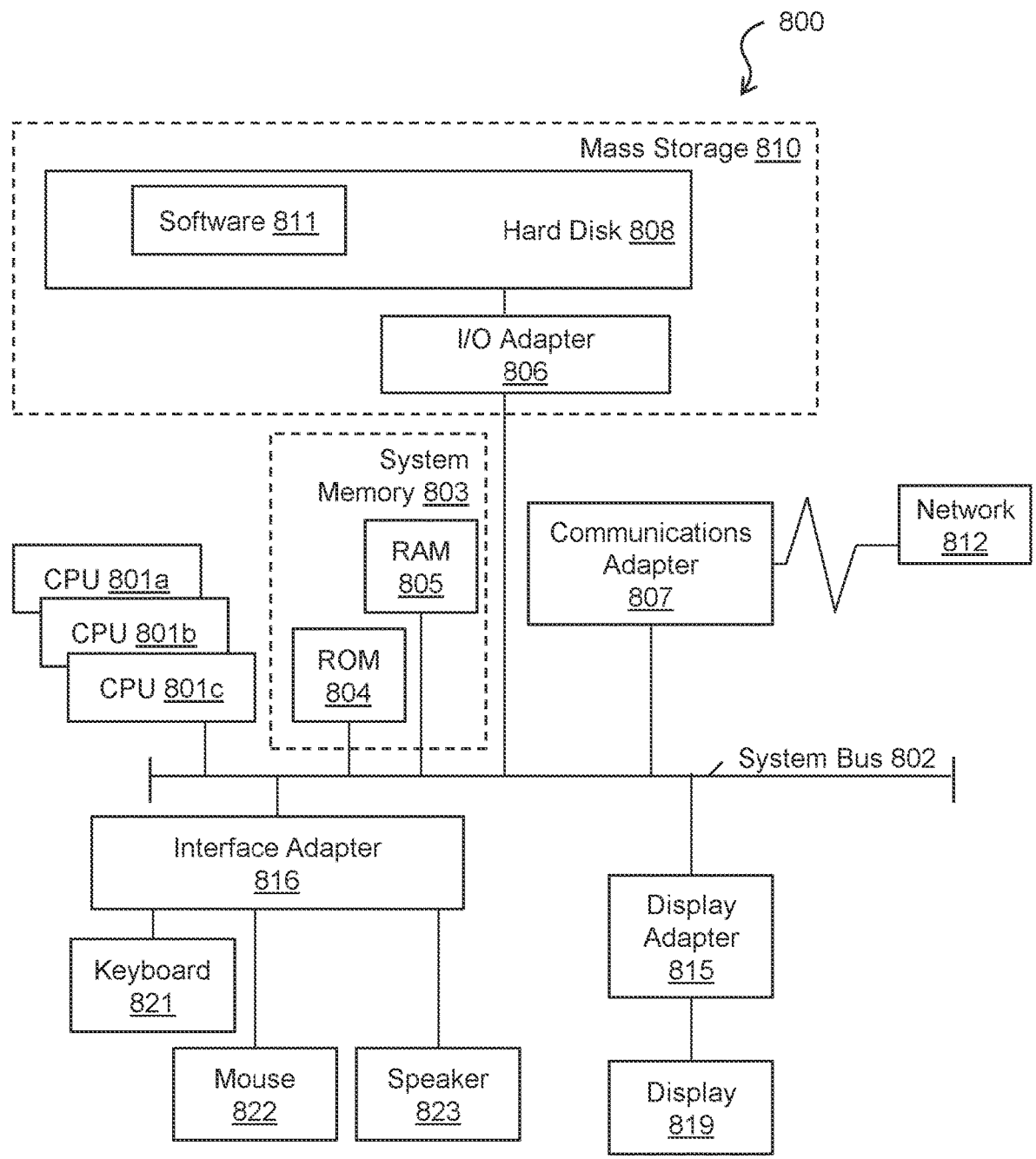
FIG. 9 illustrates a block diagram of a computer system for use in implementing one or more embodiments of the present invention.

Referring to FIG. 3, a process flow 300 for training a gated recurrent unit neural network 104 is shown. It should be appreciated that a portion of or all of the functionality described by FIGS. 3, 4, 5, and 6 can be performed by a computer system (e.g., computer system 900 as illustrated in FIG. 9) and/or a cloud computing node (cloud computing node 50 as illustrated in FIG. 7). At block 302, a training unit 102 can set a respective time to extract features from multiple computing systems. The features are extracted from performance data and indicative of a root cause of an abnormal state of a computing system. The time can be based on a set calendar-based schedule, or based on each computing system's operating times. The training unit 102 is configured to collect data only when a computer system is in an abnormal state. A computer system is in an abnormal state when the system parameters exhibit time-based patterns that deviate from expected parameter patterns. The training unit 102 can monitor the computing systems at set calendar-based times and collect data in the event that a computing system is in an abnormal state. If, however, the computing system is in a normal computing state, the training unit 102 can waiting until the next calendar-based time to determine whether the computing system is in an abnormal state. A portion of the collected data is labeled to correlate different system parameter values with different root causes of an abnormal state, while the balance of the training data remains unlabeled. The labelling can alternatively be performed externally, for example, by a software engineer.

At block 304, the training unit 102 normalizes the unlabeled training data. The training unit 102 normalizes the values received from the multiple computer systems in abnormal states. The values are normalized by rescaling the values between a range of zero to one. The normalized data and the labeled data are combined into a data set. The training unit 102 separates a portion of the normalized data and stores it in memory to be used to test a trained GRU neural network 104 at block 306.

At block 308, the training unit performs data augmentation on the balance of the data. The data augmentation increases the size of the training data by modifying the existing data to produce synthetic data. Data augmentation helps reduce overfitting by neural networks that have been trained on too small of a sample size. The training unit 102 further normalizes the synthetic data to conform to the normalized collected data. The training unit 102 labels the synthetic data and combines the labeled synthetic data with the unlabeled collected data.

At block 310, the training unit 102 performs an unsupervised dimension reduction and an unsupervised clustering. The training unit 102 performs unsupervised dimension reduction to reduce the number of features extracted from the performance data. The training unit 102 is operable to perform the unsupervised dimension reduction through feature selection or feature extraction. Feature selection involves the use of greedy algorithms (e.g. random forest feature importance) to identify important features from the performance data and removing unimportant features. Feature extraction involves projecting features onto a feature space such that features in the features space are combinations of the original features.

The training unit 102 performs unsupervised clustering to determine groupings of the labeled and unlabeled data after dimension reduction. The training unit 102 calculates a proximity matrix for the parameter variables of the labeled and unlabeled data. Initially, each parameter variable is considered its own distinct cluster. The training unit 102 iteratively moves the closest parameter variables closer to each other, and then updates the calculated proximity matrix. This creates new clusters comprising one or more parameter variables. The training unit 102 repeats this process until all of the parameter variables have been moved into n-clusters. The training unit 102 detects which labeled data in included in each cluster to classify each cluster.

At block 312, the training unit 102 uses the clustered data as an input for a semi-supervised algorithm to train the GRU neural network 104. The training unit 102 initially trains the GRU neural network 104 using the labeled training data from each cluster. The training unit 102 then trains the GRU neural network 104 using the unlabeled data. The training unit 102 uses statistical methods to finds similarities between predictions using the unlabeled data and the labeled data. If, the GRU neural network 104 does not generate the same predictions using the label data and the unlabeled data within a statistical threshold, the process flow returns to block 312. The training unit 102 continues to train the GRU neural network 104 until it begins to make similar predictions for unlabeled data as similar labeled data.

Once the GRU neural network 104 does generate similar predictions using the label data and the unlabeled data within a statistical threshold, the unlabeled data in each cluster is labeled in conformality with the labeled data in their respective cluster. At block 314, the labeled data is transmitted to test a trained GRU neural network. If any unlabeled data remains, the data is manually labeled at block 316. The manually labelled data is then transmitted to test a trained GRU neural network.

Figure 4:
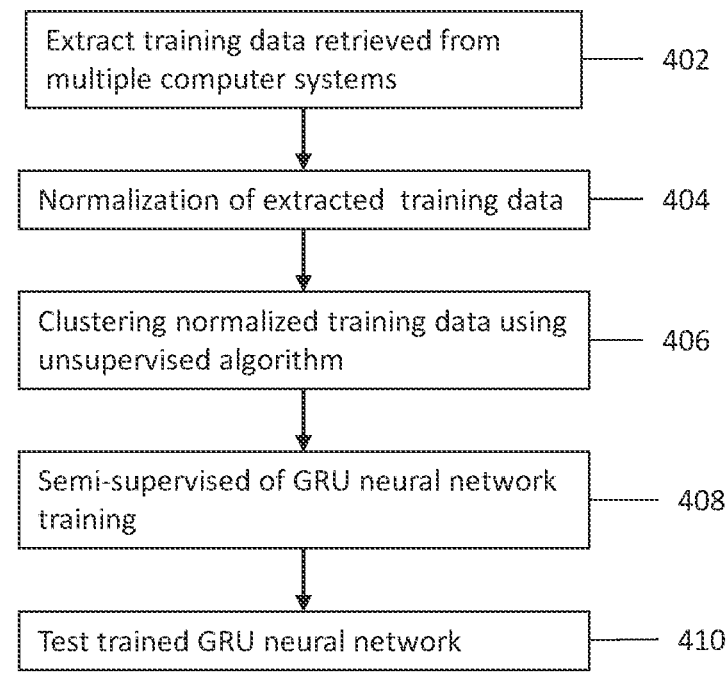
FIG. 4 illustrates a process flow for training a GRU neural network according to one or more embodiments of the present invention.
Figure 4:

Referring to FIG. 4, a process flow 400 illustrating a methodology for a training unit 102 to train a gated recurrent unit (GRU) neural network 104 according to one or more embodiments of the present invention, is shown. At block 402, the training unit 102 receives training data from multiple computing systems. The training data includes, but is not limited to, runtime data, memory data, and computer system state data. In some embodiments of the present invention, the multiple computer systems are monitored to determine if they are in a normal state or an abnormal state. A computer system is in an abnormal state when the system parameters exhibit time-based patterns that deviate from expected parameter patterns. If the one or more of the multiple computer systems are in an abnormal state, data is sampled from each computer in an abnormal state. The training unit 102 varies the sampling time based on a period of time that a computer system has been in an abnormal state. The longer that a computer system has been in an abnormal state, the smaller the sampling frequency. In this sense, the number of collected data points is approximately uniform, regardless of a length of time that computer system is an abnormal state. A portion of the training data is labeled to correlate different system parameter values with different root causes of an abnormal state, while the balance of the training data remains unlabeled.

It should be appreciated that in addition to receiving training data from multiple computer systems, the system 100 can receive training data from an operating GRU neural network as feedback. The feedback is used to further train the GRU neural network 104 to generate more accurate predictions for the root cause of error and predict suggestions for addressing the root cause. To generate more accurate predictions, the weights of the GRU neural network 104 are adjusted to generate more accurate results based on the feedback. For example, the feedback can be applied to a cost function that evaluates the accuracy of the GRU neural network 104. Based on the cost function analysis, the GRU neural network 104 can adjust its weights through backpropagation.

At block 404, the training unit 102 normalizes the unlabeled training data. The system normalizes the values received from the multiple computer systems. The values are normalized by rescaling the values to between a range of zero to one. The normalized data and the labeled data are combined into a data set. A portion of the data set is used to test the GRU neural network 104 after training (see block 310). The balance of the combined data set is used to train the GRU neural network 104.

At block 406, the training unit 102 uses the balance of the data set to train the GRU neural network 104. The training data includes such a large amount of input variables (dimensions) that the performance of a GRU neural network. Therefore the training data undergoes a process of unsupervised dimensionality reduction to reduce the number of variables. In some embodiments of the present invention, the training unit 102 employs a feature selection technique that include wrapper methods and filter methods. The wrapper method involves the training unit 102 using different subsets of training data to determine which subset produces the best performance for the GRU neural network 104. The dimensions are reduced to reach the desired subsets. The filter method involves the training unit 102 using a scoring method to associate a desired input feature with a training data variable. The dimensions are reduced to remove the low scoring input features.

To assist with an automated labeling process, the training unit 102 uses unsupervised clustering techniques to cluster the training data to separate the data into recognizable groups at block 406. The data set can be clustered based on various characteristics, for example, origin (e.g., memory, input/output, and peripheral device) and time interval (e.g., data, month, and year). The clustering can also be based on a relationship to events. For example, if an abnormal state was characterized by a low swap space, the training data can be clustered by abnormal states prior to the abnormal state was characterized by a low swap space, or abnormal states after the abnormal state was characterized by a low swap space. Therefore, the training unit 102 can create a respective cluster for data retrieved from memory during each abnormal state prior the abnormal state was characterized by a low swap space. The training unit 102 can also create a respective cluster for data retrieved from memory during each abnormal state after the abnormal state was characterized by a low swap space. Various methods can be used to perform the unsupervised data clustering such as K-means, fuzzy K-means, hierarchical, and Gaussian clustering.

In some embodiments of the present invention, the training unit 102 uses an unsupervised hierarchical cluster method. The training unit 102 calculates a proximity matrix for the parameter variables. Initially, each parameter variable is considered its own distinct cluster. The training unit 102 iteratively moves the closest parameter variables closer to each other, and then updates the calculated proximity matrix. This creates new clusters comprising one or more parameter variables. The training unit 102 repeats this process until all of the parameter variables have been moved into n-clusters. The training unit 102 can then calculate a similarity between the clusters. Various methods can be applied to calculate a similarity between clusters. For example, if a first cluster includes a first parameter variable and a second cluster includes a second parameter variable, and the distance between the first parameter variable and the second parameter variable is below a threshold distance, the two clusters are considered similar. The training unit 102 generates a dendrogram, which describes a hierarchical relationship between the parameter variables, and final clustering is reflected by the dendrogram.

At block 408, the training unit 102 inputs the clustered data into the GRU neural network 104 for semi-supervised training. The GRU neural network 104 receives the clustered training data, which includes labeled and unlabeled data. The GRU neural network 104 is initially trained using the labeled training data, by extracting features from the training data, and learning how to predict a root cause of an error alert. The GRU neural network is then trained used the unlabeled data by extracting features and learning how to predict a root cause of an error alert. The training unit 102 uses statistical methods to finds similarities between unlabeled data clusters and the labeled data clusters. The training unit 102 continues to train the GRU neural network 104 until it begins to make the same predictions for unlabeled data as similar labeled data. For example, if the GRU neural network 104 makes the same prediction for an unlabeled data cluster as similar labeled data clusters in ninety-five percent of the predictions. Once the GRU neural network 104 makes the same prediction, the unlabeled data and the labeled data are merged to a single cluster for their corresponding prediction.

Once the GRU neural network 104 predicts a root cause, it continues to use the labeled training data to predict a suggestion for addressing the root cause. The training data is labeled to include the predicted root cause and the predicted suggestion. In some embodiments of the present invention, the system 100 further takes measures by causing the target computer system 106 to alter its operation in response to the prediction of the root cause of the error alert. For example, the GRU neural network predicts that a root cause is too many users accessing the target computer system 106, the system 100 can cause the target computer system 106 to address the situation (e.g., prohibit additional users from accessing the target computer system 106, or provisioning additional virtual machines to address the increased number of users).

At block 410, the training unit 102 can test the GRU neural network 104 using the portion of the data set described in relation to block 304 and the labeled training data generated at block 408. The training unit 102 can use an area under the curve-receiver operating characteristics (AUC-ROC) curve as a measure of the performance of the trained GRU neural network 104 over designated thresholds. The AUC curve measure a degree of separability between predictions and the ROC curve is a probability curve. The AUC-ROC curve describe how well the GRU neural network 104 can distinguish between predicted classes of root cause and suggestion. Once the trained GRU neural network 104 achieves a measure of performance at a desired threshold, the training unit 102 considers the GRU neural network 104 ready for deployment.

Figure 5:
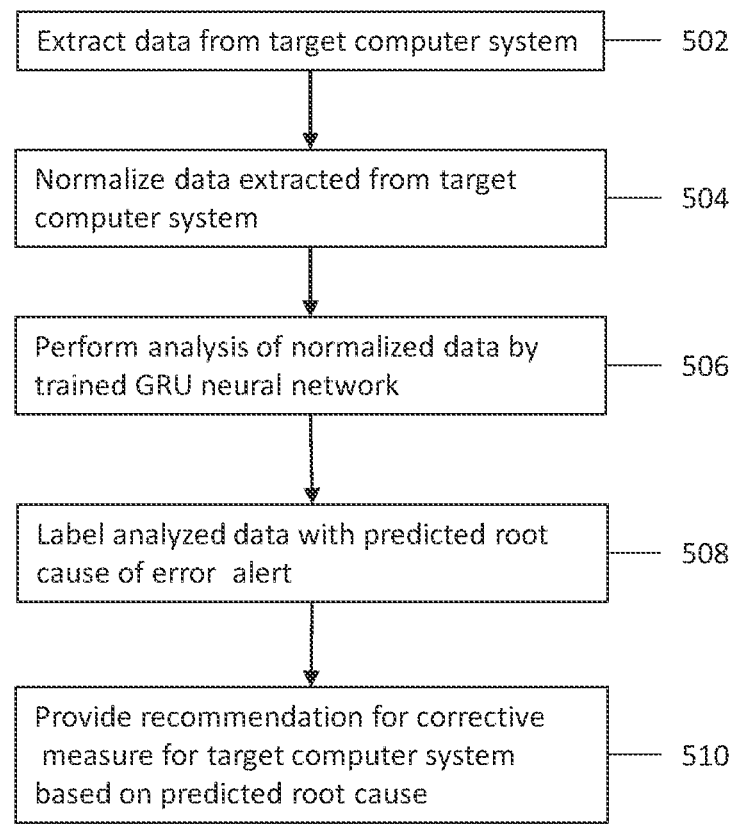
FIG. 5 illustrates a process flow predicting a root cause of an error alert according to one or more embodiments of the present invention.

Referring to FIG. 5, a process flow 500 for predicting a root cause of an error alert according to one or more embodiments of the present invention is shown. At block 502, the system 100 can extract data, including time-series data, from a target computer system 106. The data can in the form of runtime data, parameter variables such memory data, I/O data, and execution data. The data is retrieved in response receiving an error alert from the target computer system 106. In some embodiments of the present invention, the system 100 generates and stores a target log of the target computer system 106. The target log can continuously receive data from logs of the target computer system 106, for example, event logs, transaction logs, message logs, server logs, and other logs that store performance data of the target computer system 106. The system 100 can continuously update the target log with data; including log data, from the target computer system 106. Upon receiving the error alert, the retrieves a state of the target computer system 106, and reconciles the parameter values included in the retrieved state data with the values stored in the target log.

At block 504, the system 100 normalizes the data retrieved from the target computer system 106. The values are normalized by rescaling the values to between a range of zero to one. In some embodiments of the present invention, the data is retrieved directly from the target log and then normalized. The values stored in the target log are then normalized for consistency with the normalized values to be used as inputs into the GRU neural network 104. At block 506, the normalized values are entered as inputs into the GRU neural network 104. The GRU neural network 104 processes the inputs across an array of GRUs determining which information to keep and which information to forget.

At block 508, the GRU neural network 104 generates a prediction as to a root cause of the error alert. The GRU neural network 104 further labels the data retrieved from the target computer system 106 with the predicted root case. At block 510, the GRU neural network 104 further provides a recommendation as to how to address the root cause error.

Figure 6:
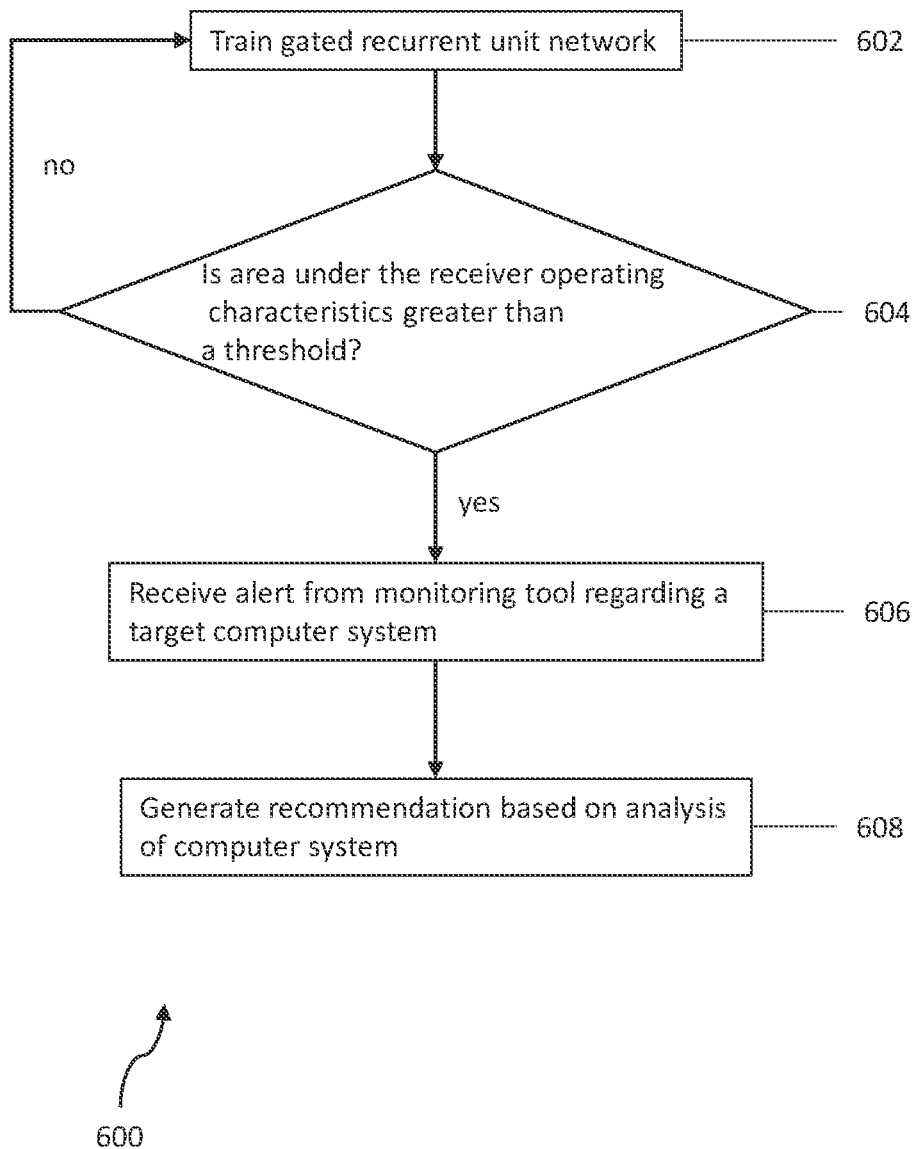
FIG. 6 illustrates a process flow predicting a root cause of an error alert according to one or more embodiments of the present invention.
Figure 7:
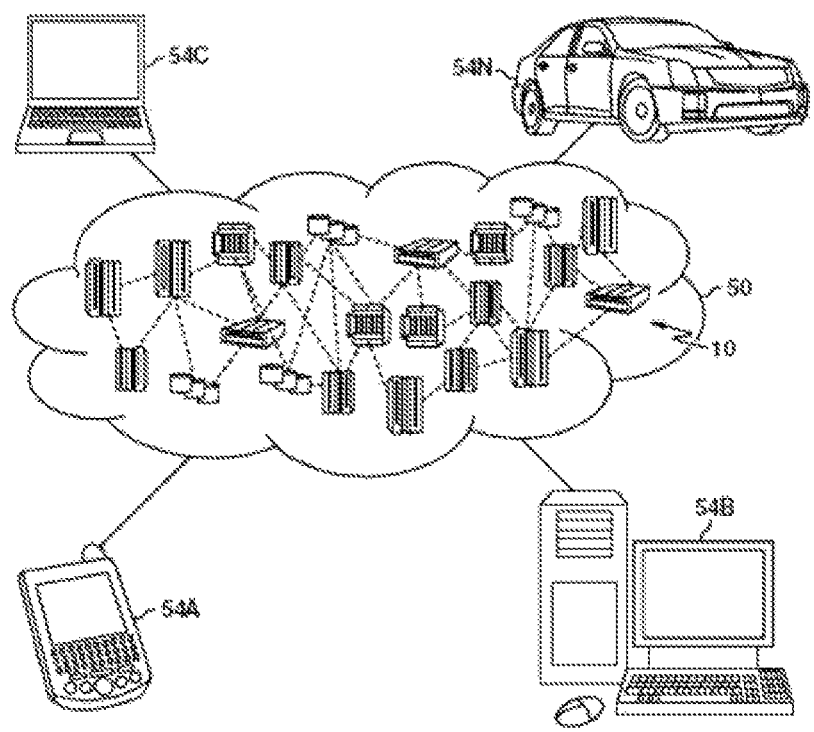
FIG. 7 illustrates a cloud computing environment according to one or more embodiments of the present invention.

Referring to FIG. 6, a process flow 600 for predicting a root cause of an error alert according to one or more embodiments of the present invention is shown. At block 602, a training unit 102 trains a gated recurrent unit (GRU) neural network 104. The training includes monitoring multiple computer systems to determine whether one or more of the computer systems are in a normal or abnormal state. The determination is performed by comparing the values generated by each computer system while operating with expected values. If the generated values deviate from the expected values for a computer system, the training unit 102 determines that the computer system is in an abnormal state. The training unit 102 samples data from each computer system in an abnormal state, and normalizes the data for input into a GRU neural network 104. The GRU neural network 104 receives the training data from a training unit 102 and generates a prediction of a root cause of an error causing an abnormal state of a computer system.

A block 604, the training unit 102 measures the performance of the GRU neural network 104 based on an area under the curve-receiver operating characteristics (AUC-ROC) curve. If the GRU neural network 104 is not performing at a threshold level, the process flow 600 returns to block 602 for continued training. If the GRU neural network 104 is performing at a threshold level, the GRU neural network 104 is implemented into a system 100, and the process flow 600 continues to block 606.

At block 606, the system 100 is in operable communication with a target computer system 106. The system 100 monitors the target computer system 106 in real-time and receives an alert. In response to receiving the alert, the system 100 retrieves data in the form of values from the target computer system 106.

At block 608, the system 100 enters the values into the GRU neural network 104 as inputs. The GRU neural network 104 extracts features from the values and uses a classifier to predict a root cause of the error alert based on a statistical analysis of the extracted features. In addition to predicting a root cause of the error alert, the GRU neural network 104 predicts a suggested course of action to address the root cause of the neural network.

Exemplary illustrations include the following: consider a situation, in which system 100 receives an indication from a target computer system 106 that the swap space on a hard disk is full and the operating system unable to recover (e.g., free up swap space). The system 100 receives as inputs data, for example, memory data of the target computer system 106, analyzes the data, and predicts a root cause. Based on the root cause, the system 100 generates a suggestion. For example, the system 100 can receive the memory data and determine that the root cause of the low available swap space is that the available memory is below a threshold level. The system 100 generates a suggestion to delete unused memory. Prior to a user making a decision, the system can automatically segregate memory in the target computer system 106 between recently used data and data that has not been recently used. The system 100 can also proactively determine which process is utilizing the greatest amount of memory.

In another scenario, the system 100 can receive an alert of low swap space. where the available memory is within an acceptable threshold range. The system 100 predicts that the cause of the low swap space is that too many processes are executing. The system 100 can then suggest that the user executing the largest percentage of processes be required to reduce the number of used processes.

In another scenario, the system 100 can receive an alert that the amount of available swap space is greater than a threshold amount. The system 100 can further receive data indicating that the memory, total number of processes, and other indicators indicate that the target computer system 106 is performing normally. The system 100 predicts that the cause of the alert is that the threshold amount for available swap space is too low. The system 100 can further suggest the system 100 increase the threshold amount of available space that is detected to trigger an alert.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed. In yet another scenario, the system 100, the performance data from the operating system is normal, and yet the system 100 receives an alert. In this situation, the system 100 can record a state of a system and be trained to detect additional features from the performance data to determine the root cause of an error. For example, the system 100 can modify the weights of the GRUs, in response to being unable to determine a cause of an alert.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
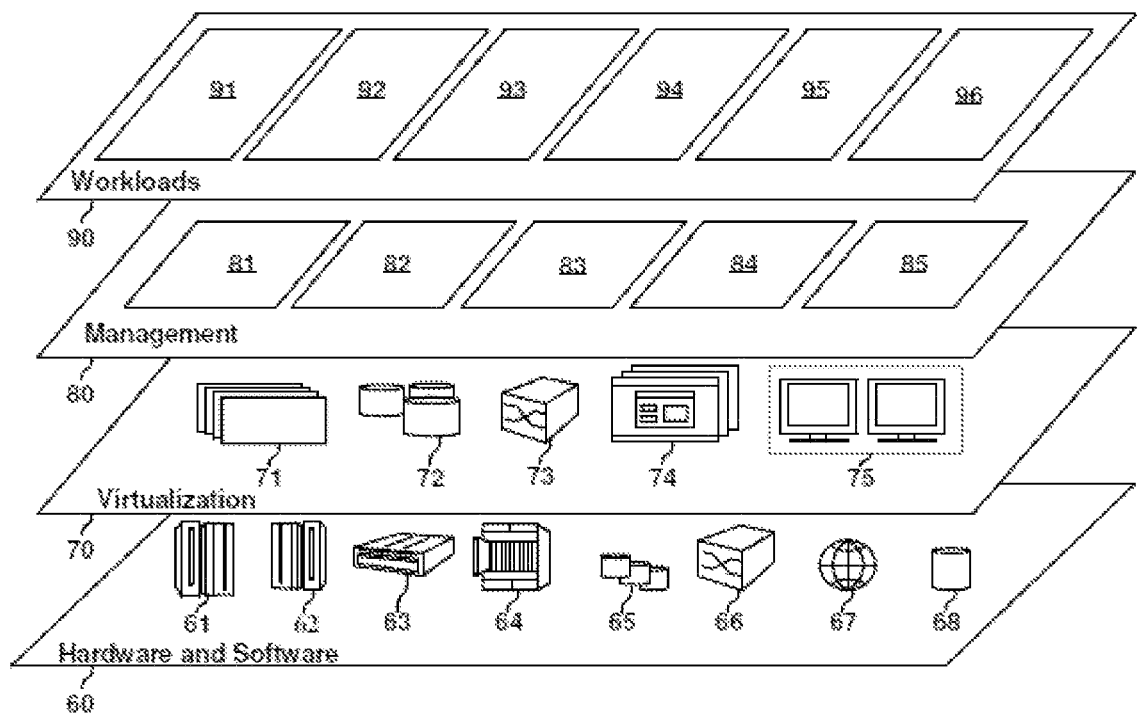
FIG. 8 illustrates abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtualization 93; data analytics processing 94; transaction processing 95; and predicting a root cause of an error alert 96.

In one or more embodiments of the present invention, the hardware/software modules in the system 100 from FIG. 1 can be implemented on the processing system 900 found in FIG. 9. Turning now to FIG. 9, a computer system 900 is generally shown in accordance with an embodiment. The computer system 900 can be an electronic, computer framework comprising and/or employing any number and combination of computing devices and networks utilizing various communication technologies, as described herein. The computer system 900 can be easily scalable, extensible, and modular, with the ability to change to different services or reconfigure some features independently of others. The computer system 900 may be, for example, a server, desktop computer, laptop computer, tablet computer, or smartphone. In some examples, computer system 900 may be a cloud computing node, such as a node 50 of FIG. 7. Computer system 900 may be described in the general context of computer system executable instructions, such as program modules, being executed by a computer system. Generally, program modules may include routines, programs, objects, components, logic, data structures, and so on that perform particular tasks or implement particular abstract data types. Computer system 900 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 9, the computer system 900 has one or more central processing units (CPU(s)) 901a, 901b, 901c, etc. (collectively or generically referred to as processor(s) 801). The processors 901 can be a single-core processor, multi-core processor, computing cluster, or any number of other configurations. The processors 901, also referred to as processing circuits, are coupled via a system bus 902 to a system memory 903 and various other components. The system memory 903 can include a read only memory (ROM) 904 and a random access memory (RAM) 905. The ROM 904 is coupled to the system bus 902 and may include a basic input/output system (BIOS), which controls certain basic functions of the computer system 900. The RAM is read-write memory coupled to the system bus 902 for use by the processors 901. The system memory 903 provides temporary memory space for operations of said instructions during operation. The system memory 903 can include random access memory (RAM), read only memory, flash memory, or any other suitable memory systems.

The computer system 900 comprises an input/output (I/O) adapter 906 and a communications adapter 907 coupled to the system bus 902. The I/O adapter 906 may be a small computer system interface (SCSI) adapter that communicates with a hard disk 908 and/or any other similar component. The I/O adapter 906 and the hard disk 908 are collectively referred to herein as a mass storage 910.

Software 911 for execution on the computer system 900 may be stored in the mass storage 910. The mass storage 910 is an example of a tangible storage medium readable by the processors 901, where the software 911 is stored as instructions for execution by the processors 901 to cause the computer system 900 to operate, such as is described herein below with respect to the various Figures. Examples of computer program product and the execution of such instruction is discussed herein in more detail. The communications adapter 907 interconnects the system bus 902 with a network 912, which may be an outside network, enabling the computer system 900 to communicate with other such systems. In one embodiment, a portion of the system memory 903 and the mass storage 910 collectively store an operating system, which may be any appropriate operating system, such as the z/OS or AIX operating system from IBM Corporation, to coordinate the functions of the various components shown in FIG. 9.

Additional input/output devices are shown as connected to the system bus 902 via a display adapter 915 and an interface adapter 916 and. In one embodiment, the adapters 906, 907, 915, and 916 may be connected to one or more I/O buses that are connected to the system bus 902 via an intermediate bus bridge (not shown). A display 919 (e.g., a screen or a display monitor) is connected to the system bus 902 by a display adapter 915, which may include a graphics controller to improve the performance of graphics intensive applications and a video controller. A keyboard 921, a mouse 922, a speaker 923, etc. can be interconnected to the system bus 902 via the interface adapter 916, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 9, the computer system 900 includes processing capability in the form of the processors 901, and, storage capability including the system memory 903 and the mass storage 910, input means such as the keyboard 921 and the mouse 922, and output capability including the speaker 923 and the display 919.

In some embodiments, the communications adapter 907 can transmit data using any suitable interface or protocol, such as the internet small computer system interface, among others. The network 912 may be a cellular network, a radio network, a wide area network (WAN), a local area network (LAN), or the Internet, among others. An external computing device may connect to the computer system 900 through the network 912. In some examples, an external computing device may be an external webserver or a cloud computing node.

It is to be understood that the block diagram of FIG. 9 is not intended to indicate that the computer system 900 is to include all of the components shown in FIG. 9. Rather, the computer system 900 can include any appropriate fewer or additional components not illustrated in FIG. 9 (e.g., additional memory components, embedded controllers, modules, additional network interfaces, etc.). Further, the embodiments described herein with respect to computer system 900 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method comprising:
    detecting, by a processor, an error alert from a target computer system;
    retrieving, by the processor, performance data from the target computer system in response to detecting the error alert;
    generating, by the processor and via a gated recurrent unit (GRU) neural network, a prediction of a root cause of the error alert based on the performance data;
    receiving, by the processor, feedback of the prediction; and
    adjusting, by the processor, a weights of a reset gate of the GRU neural network based on the feedback,
    wherein the GRU neural network is trained by:
        detecting a first computer system in an abnormal state and a second computer system in an abnormal state, when a determination that the first computer system and the second computer system are in abnormal states is based on system parameters the first computer system and the second computer system exhibiting time-based patterns that deviate from expected parameter patterns;
        extracting unlabeled data from the first computer system in the abnormal state, wherein the unlabeled data is extracted from the first computer system based on a sampling frequency that varies continuously during a period of time that the first computer system has been in an abnormal state, and wherein the sampling frequency is inversely proportional to the period of time that the first computer system has been in an abnormal state;
        labeling the extracted data from the first computer system with the root cause;
        clustering the labeled data from the first computer system with unlabeled data from the second computer system;
        training the GRU neural network initially with the labeled data from the first computer system; and
        training the GRU neural network subsequently with the unlabeled data from the second computer system.

2. The computer-implemented method of claim 1, wherein the method further comprises generating a prediction for a suggestion to address the root cause of the error alert.

3. The computer-implemented method of claim 1, wherein the method further comprises:
    calculating a proximity matrix describing a position of each value of the performance data described by the unlabeled data and a position each value of the performance data described by the labeled data;
    iteratively moving together values described by the unlabeled data to form a first cluster;
    iteratively moving together values described by the labeled data to form a second cluster;
    determining that a distance between a value of the first cluster and a value of the second cluster is within a threshold distance; and
    determining that the first cluster is similar to the second cluster based on the distance being less than the threshold distance.

4. The computer-implemented method of claim 3, wherein the method further comprises determining that the GRU neural network is trained based on an area under the curve-receiver operating characteristics (AUC-ROC) curve.

5. The computer-implemented method of claim 1, wherein the method further comprises adjusting a weight of an update gate of the GRU neural network based on the feedback.

6. The computer-implemented method of claim 1, wherein the method further comprises provisioning resources of the target computer system to address the root cause of the error alert.

7. A system comprising:
    a memory having computer readable instructions; and
    one or more processors for executing the computer readable instructions, the computer readable instructions controlling the one or more processors to perform operations comprising:
        detecting an error alert from a target computer system;
        retrieving performance data from the target computer system in response to detecting the error alert;
        generating via a gated recurrent unit (GRU) neural network, a prediction of a root cause of the error alert based on the performance data;
        receiving feedback of the prediction; and
        adjusting the weights of a reset gate of the GRU neural network based on the feedback,
        wherein the GRU neural network is trained by:
            detecting a first computer system in an abnormal state and a second computer system in an abnormal state, when a determination that the first computer system and the second computer system are in abnormal states is based on system parameters the first computer system and the second computer system exhibiting time-based patterns that deviate from expected parameter patterns;
            extracting unlabeled data from the first computer system in the abnormal state, wherein the unlabeled data is extracted from the first computer system based on a sampling frequency that varies continuously during a period of time that the first computer system has been in an abnormal state, and wherein the sampling frequency is inversely proportional to the period of time that the first computer system has been in an abnormal state;
            labeling the extracted data from the first computer system with the root cause;

clustering the labeled data from the first computer system with unlabeled data from the second computer system;

training the GRU neural network initially with the labeled data from the first computer system; and training the GRU neural network subsequently with the unlabeled data from the second computer system.

8. The system of claim 7, wherein the operations further comprise generating a prediction for a suggestion to address the root cause of the error alert.

9. The system of claim 7, wherein the operations further comprise:

calculating a proximity matrix describing a position of each value of the performance data described by the unlabeled data and a position each value of the performance data described by the labeled data;

iteratively moving together values described by the unlabeled data to form a first cluster;

iteratively moving together values described by the labeled data to form a second cluster;

determining that a distance between a value of the first cluster and a value of the second cluster is within a threshold distance; and determining that the first cluster is similar to the second cluster based on the distance being less than the threshold distance.

10. The system of claim 9, wherein the operations further comprise the method further comprises determining that the GRU neural network is trained based on an area under the curve-receiver operating characteristics (AUC-ROC) curve.

11. The system of claim 7, wherein the operations further comprise adjusting a weight of an update gate of the GRU neural network based on the feedback.

12. The system of claim 7, wherein the operations further comprise provisioning resources of the target computer system to address the root cause of the error alert.

13. A computer program product comprising a computer readable storage medium having program instructions embodied therewith, the program instructions executable by a processor to cause the processor to perform operations comprising:

detecting an error alert from target computer system;

retrieving performance data from the target computer system in response to detecting the error alert;

generating via a gated recurrent unit (GRU) neural network, a prediction of a root cause of the error alert based on the performance data; and receiving feedback of the prediction; and adjusting the weights of a reset gate of the GRU neural network based on the feedback, wherein the GRU neural network is trained by:

detecting a first computer system in an abnormal state and a second computer system in an abnormal state, when a determination that the first computer system and the second computer system are in abnormal states is based on system parameters the first computer system and the second computer system exhibiting time-based patterns that deviate from expected parameter patterns;

extracting unlabeled data from the first computer system in the abnormal state, wherein the unlabeled data is extracted from the first computer system based on a sampling frequency that varies continuously during a period of time that the first computer system has been in an abnormal state, and wherein the sampling frequency is inversely proportional to the period of time that the first computer system has been in an abnormal state;

labeling the extracted data from the first computer system with the root cause;

clustering the labeled data from the first computer system with unlabeled data from the second computer system;

training the GRU neural network initially with the labeled data from the first computer system; and training the GRU neural network subsequently with the unlabeled data from the second computer system.

14. The computer program product of claim 13, wherein the operations further comprise:

generating a prediction for a suggestion to address the root cause of the error alert.

15. The computer program product of claim 13, wherein the operations further comprise:

calculating a proximity matrix describing a position of each value of the performance data described by the unlabeled data and a position each value of the performance data described by the labeled data;

iteratively moving together values described by the unlabeled data to form a first cluster;

iteratively moving together values described by the labeled data to form a second cluster;

determining that a distance between a value of the first cluster and a value of the second cluster is within a threshold distance; and determining that the first cluster is similar to the second cluster based on the distance being less than the threshold distance.

16. The computer program product of claim 15, wherein the operations further comprise adjusting a weight of an update gate of the GRU neural network based on the feedback.

17. The computer program product of claim 13, wherein the operations further comprise provisioning resources of the target computer system to address the root cause of the error alert.

* * * * *